Patented May 16, 1933

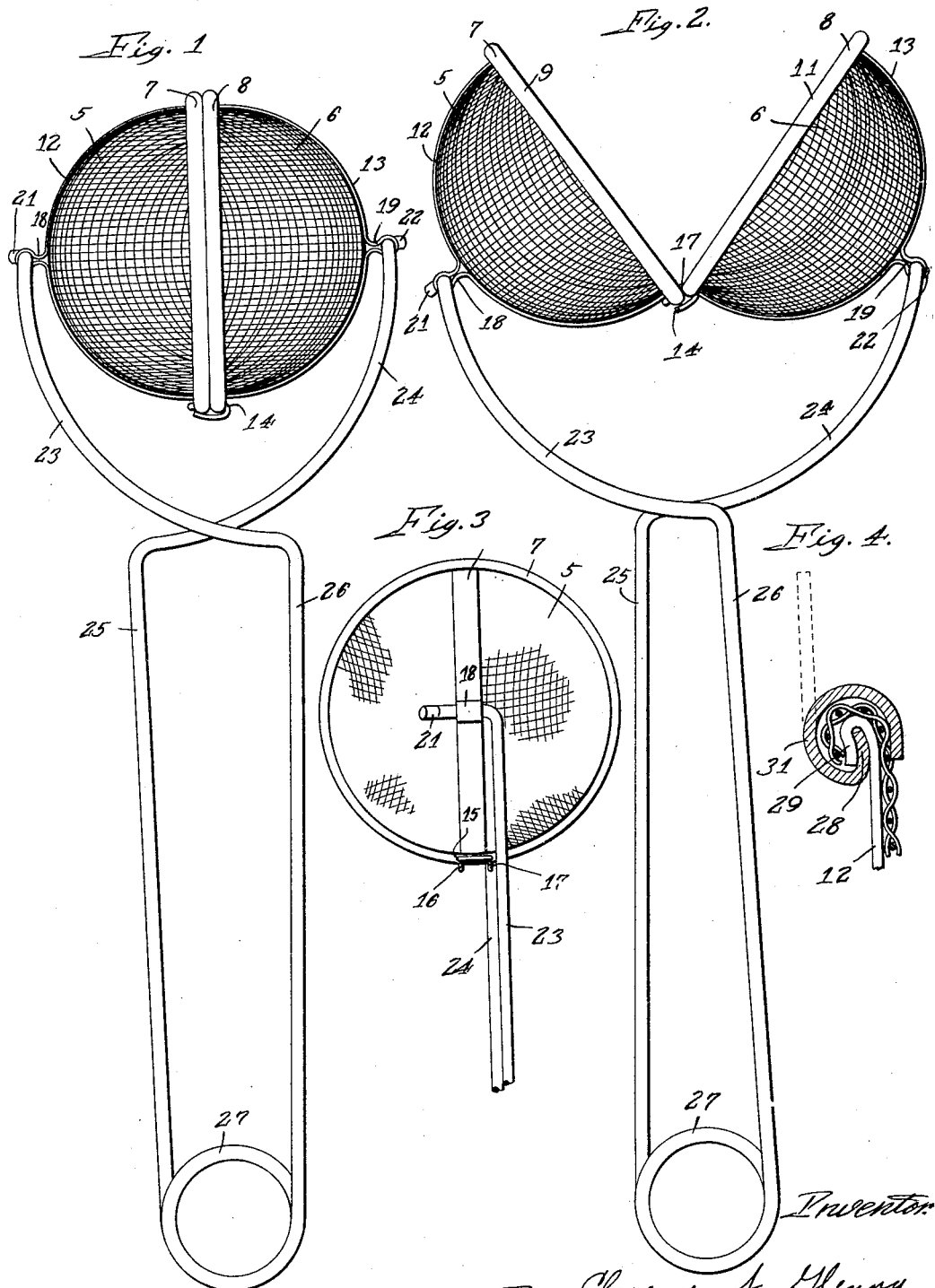

1,909,399

UNITED STATES PATENT OFFICE

CLARENCE S. GLENNY, OF ROCKFORD, ILLINOIS, ASSIGNOR TO THE WASHBURN COMPANY, OF WORCESTER, MASSACHUSETTS, A CORPORATION OF MASSACHUSETTS

HOUSEHOLD APPLIANCE

Application filed May 9, 1931. Serial No. 536,131.

This invention relates to household devices and has special reference to a device adapted to be employed for transporting materials and for transporting and sifting finely comminuted solids such as flour.

I have aimed to provide a receptacle of novel design and means for opening and closing said receptacle.

Another object of the invention is the provision of a transporting and sifting receptacle having means operated from the handle thereof for opening and closing the receptacle whereby it may be opened and closed and operated in all its uses with a single hand.

I have also aimed to provide a receptacle having a rim of improved construction.

A further object of the invention is to provide a receptacle of perforate material adapted to be normally held in a closed position and be opened and closed through manipulation at the handle thereof, whereby the receptacle may be filled with flour or the like by plunging the open receptacle into the flour and be discharged by sifting through the closed receptacle.

A still further object of the invention is the provision of combined measuring, transporting and sifting mechanism having a normally closed perforate receptacle adapted to be opened for charging and, in some instances, for discharging the contents thereof.

Other objects and attendant advantages will become apparent to those skilled in the art from the following description and the accompanying drawing in which—

Figure 1 is a side view of the device in the closed position;

Fig. 2 is a side view of the device in the open position;

Fig. 3 is a top view of the receptacle and a portion of the handle; and

Fig. 4 is a section through one rim adjacent to a rib.

In a general way the invention contemplates the provision of a clam-shell type receptacle, which may, if desired, have a general spherical shape such as shown in the drawing, divided into two parts and hinged together. Means are provided, associated with a handle, for supporting the receptacle and for moving the two parts thereof about the hinged connection between a closed position and an open position. One of the features of the device is the fact that the entire manipulation thereof may be and is normally accomplished with but a single hand.

Referring now to the drawing, the receptacle may advantageously consist of two half spherical parts 5 and 6, positioned together to form a receptacle of general spherical shape as shown in Fig. 1. One of the features of the invention lies in the fact that the receptacle may be made different sizes to accommodate desired amounts, such for example, as one half cup and full cup, and when inserted into the material may conveniently be completely filled with the material. Furthermore, since the material in the receptacle is visible, the amount used may be visually estimated, as, for example, the receptacle may be filled and an estimated amount used therefrom. The parts 5 and 6 of the receptacle may be formed of suitable perforate material such, for example, as wire cloth, the edges thereof being held by the customary crimped rims 7 and 8. The rims 7 and 8 are of substantially the same size and are provided with inner faces 9 and 11 adapted to be brought into contact to form a relatively tight junction between the two parts of the receptacle.

Sheet metal reenforcing strips 12 and 13 are circumferentially positioned on each of the parts 5 and 6, the strips serving to reenforce the wire cloth from which the parts are made and to provide means for attaching a handle presently to be described. The two parts 5 and 6 are hingedly connected together at one junction of the rims 7 and 8 and the ribs 12 and 13 by means of a U-shaped wire 14 passing through small openings in the rims 7 and 8 as shown at 15, the ends 16 and 17 thereof being formed into loops at right angles to the plane of the U to rest against the outer edges of the rims 7 and 8. This construction permits the two parts 5 and 6 of the receptacle to move about the hinge member as shown in Fig. 2. The hinge member passes through the rims and the ends, 16 and 17 thereof bear against the outer edge of the rims whereby the two parts 5 and 6 of the receptacle are maintained in alignment to prevent loss of material at the junction of the rims. This provides a rigid structure, secures the rims therein and permits the provision of a rim of small height.

Loops 18 and 19 are formed in the ribs 12 and 13 substantially equi-distant between the ends thereof to receive the ends 21 and 22 of arcuate fingers 23 and 24. The fingers 23 and 24 are integral at their opposite ends with arms 25 and 26, the fingers lying in closely parallel planes and having sliding contact with each other at the point of intersection, as shown. The arms 25 and 26 are connected together at their rearward end through a spring coil 27, which may advantageously consist of a single turn in the heavy wire of which the arms 25 and 26 are formed. The fingers 23 and 24 and the arms 25 and 26 form a handle to support the two parts 5 and 6 of the receptacle, the spring 27 normally urging the ends 21 and 22 of the fingers toward each other, thereby normally maintaining the two parts 5 and 6 of the receptacle in their closed position as shown in Fig. 1, with the rims 7 and 8 in contact. The operator may, however, by pressing the arms 25 and 26 together as shown in Fig. 2, rotate the parts 5 and 6 of the receptacle about the hinge member into the position shown in this figure. When the arms 25 and 26 are released the parts 5 and 6 of the receptacle will immediately resume the position shown in Fig. 1, because of the tension of the spring 27.

It is evident in Fig. 2 that it requires very slight movement of the arms 25 and 26 of the handle toward each other to open the receptacle to the extent shown. That, of course, is due to the fact that the pivotal connections between the end portions of the handle and the halves of the receptacle are at intermediate points on said halves and the halves are hingedly connected as shown.

Special attention is directed to the manner in which the ribs 12 and 13 and the wire cloth are held in the rims 7 and 8. In this instance the rims are provided with an inner wall 28 over which the hooked ends 29 of the ribs are hooked. The rims are then rolled inward pressing the outer edge 31 inward thereby clamping the cloth and rib therein.

The device is suitable for a large number of household operations. For example, the device may be employed for sifting flour in the making of gravy. In this instance the hand of the operator will grasp the arms 25 and 26, drawing them together as shown in Fig. 2. The receptacle in the open position may then be plunged into a quantity of flour and the arms 25 and 26 released, whereupon a quantity of flour will be entrapped within the receptacle, in which condition it may be transported to the point of use. Then by merely shaking the device flour will be sifted through the wire cloth in quantity depending upon the amount of motion imparted to the device. It will be seen that all of these operations are carried out by one hand, leaving the other hand free for other purposes, such for example, as stirring the gravy while the flour is being added.

Another use for the device is for removing eggs from boiling water, the device being merely inserted in the boiling water and the arms 25 and 26 compressed to open the receptacle. The receptacle is then moved to encompass the egg and the arms 25 and 26 released whereby the egg will be entrapped within the receptacle. Soap chips or the like make be dissolved in water by entrapping the flakes within the receptacle and agitating the water with the receptacle in the usual manner. Numerous other uses might be set forth but this is believed to be sufficient to show the general and wide spread utility of the device for household purposes.

Many changes may be made in the device, as shown, without departing from the spirit of the invention. For example, the receptacle need not necessarily have a spherical shape but may be rectangular, cubical, or the like. In like manner, other arrangements may be employed for opening and closing the receptacle, without departing from the spirit of the invention and the scope of the appended claims in which.

I claim:

1. A device of the character described comprising an elongated U-shaped handle having end portions criss-crossed and movable relative to one another by contraction and expansion of the handle, a clam-shell type container disposed between the extremities of said end portions with the dividing line thereof in a median plane, means hingedly connecting the halves of said container in said median plane, and means providing pivotal connections between the extremities of the end portions of said handle and the backs of the container halves.

2. A device of the character described comprising a handle having spaced relatively movable end portions for supporting a container therebetween, a clam-shell type container disposed between said end portions with the dividing line thereof in a median plane, the halves of said container being formed by screen bowls disposed rim to rim, semi-circular narrow metal bands provided on each of said bowls extending diametrically thereof across the outside of the screen of the bowl and fastened at the ends to the rims of said bowls, means hingedly connecting the rims of said bowls adjacent the meeting ends of said bands, and means providing pivotal connections between the end portions of said handle and said bands intermediate the ends of the latter.

3. A device of the character described comprising an elongated U-shaped handle having end portions criss-crossed and movable relative to one another by contraction and expansion of the handle, a clam-shell type container disposed between the extremities of said end portions with the dividing line thereof in a median plane, the halves of said container being formed by screen bowls disposed rim to rim, semi-circular narrow metal bands provided on each of said bowls extending diametrically thereof across the outside of the screen of the bowl and fastened at the ends to the rims of said bowls, means hingedly connecting the rims of said bowls adjacent the meeting ends of said bands on that side adjacent the point of intersection of the end portions of said handle, and means providing pivotal connections between the extremities of the end portions of said handle and said bands intermediate the ends of the latter.

In witness of the foregoing I affix my signature.

CLARENCE S. GLENNY.